United States Patent
Schutte et al.

(10) Patent No.: US 9,523,454 B2
(45) Date of Patent: Dec. 20, 2016

(54) ANTI-ROTATION GRIPPER RING

(75) Inventors: Joseph P. Schutte, Westland, MI (US); William Franklin Turnau, III, Canton, MI (US); Brian D. Sanzone, Commerce Township, MI (US); Derry Yourman, Canton, MI (US)

(73) Assignee: BRASSCRAFT MANUFACTURING COMPANY, Novi, MI (US)

( * ) Notice: Subject to any disclaimer, the term of this patent is extended or adjusted under 35 U.S.C. 154(b) by 1031 days.

(21) Appl. No.: 12/603,142

(22) Filed: Oct. 21, 2009

(65) Prior Publication Data

US 2011/0089684 A1    Apr. 21, 2011

(51) Int. Cl.
*F16L 37/14*    (2006.01)

(52) U.S. Cl.
CPC .......... *F16L 37/144* (2013.01); *F16L 37/0915* (2016.05)

(58) Field of Classification Search
CPC ...... F16L 37/08; F16L 37/091; F16L 37/0925; F16L 37/144; F16L 37/0915
USPC ............. 285/78, 321, 332.4, 913; 251/149.1, 251/149.9, 75
See application file for complete search history.

(56) References Cited

U.S. PATENT DOCUMENTS

| | | | |
|---|---|---|---|
| 1,440,207 A | 12/1922 | Burns | |
| 2,479,960 A | 8/1949 | Osborn | |
| 3,131,905 A | 5/1964 | Nyberg | |
| 3,334,661 A * | 8/1967 | Milette | ........................... 138/89 |
| 3,429,596 A | 2/1969 | Marshall | |
| 3,776,260 A | 12/1973 | Ruddick | |
| 4,049,014 A | 9/1977 | Johnson et al. | |
| 4,336,824 A | 6/1982 | Steineman | |
| 4,613,112 A | 9/1986 | Philpot et al. | |
| 4,632,437 A * | 12/1986 | Robson et al. | ............... 285/310 |
| 4,717,048 A | 1/1988 | Stenger | |
| 4,749,214 A | 6/1988 | Hoskins et al. | |
| 5,029,908 A * | 7/1991 | Belisaire | ....................... 285/323 |
| 5,090,599 A | 2/1992 | Stenger | |
| 5,405,175 A | 4/1995 | Bonnah et al. | |
| 5,607,190 A * | 3/1997 | Exandier et al. | ............... 285/93 |
| 5,803,513 A | 9/1998 | Richardson | |
| 5,971,019 A | 10/1999 | Imai | |
| RE36,630 E * | 3/2000 | Davey | ............................. 285/39 |
| 6,142,538 A * | 11/2000 | Volgstadt | ............ F16L 37/0925 285/323 |
| 6,173,999 B1 | 1/2001 | Guest | |

(Continued)

FOREIGN PATENT DOCUMENTS

| EP | 0528079 A1 | 2/1993 |
|---|---|---|
| EP | 0745801 A1 | 12/1996 |

(Continued)

OTHER PUBLICATIONS

Search Report and Written Opinion mailed on Jan. 14, 2011 for PCT/US2010/052999.

(Continued)

*Primary Examiner* — Daniel P Stodola
*Assistant Examiner* — Zachary Dragicevich
(74) *Attorney, Agent, or Firm* — Carlson, Gaskey & Old, P.C.

(57) ABSTRACT

An apparatus for minimizing rotation of a conduit has a housing that has a keyway and envelops the conduit. A gripper holds the conduit and opposes rotation of it. The gripper has a key for cooperating with the keyway such that the housing does not rotate about the gripper.

23 Claims, 3 Drawing Sheets

(56) References Cited

U.S. PATENT DOCUMENTS

| | | |
|---|---|---|
| 6,293,596 B1 | 9/2001 | Kinder |
| 6,328,344 B1 | 12/2001 | Tozaki et al. |
| 6,450,550 B1 | 9/2002 | Cornwell |
| 6,499,771 B1 * | 12/2002 | Snyder et al. ............... 285/319 |
| 6,637,779 B2 | 10/2003 | Andre |
| 6,702,335 B2 | 3/2004 | Bahner et al. |
| 6,860,523 B2 | 3/2005 | O'Neill et al. |
| 6,893,051 B1 | 5/2005 | Park et al. |
| 6,905,143 B2 | 6/2005 | Klinger et al. |
| 7,014,220 B2 | 3/2006 | Szabo et al. |
| 7,029,036 B2 | 4/2006 | Andre |
| 7,121,592 B2 | 10/2006 | Sazbo et al. |
| 7,128,347 B2 | 10/2006 | Kerin |
| 7,232,159 B2 | 6/2007 | O'Neill et al. |
| 7,300,076 B2 | 11/2007 | Inoue |
| 7,314,209 B2 | 1/2008 | Pierson |
| 7,338,030 B2 | 3/2008 | Brown, III |
| 7,390,025 B2 | 6/2008 | Pepe et al. |
| 7,396,053 B2 | 7/2008 | Webb et al. |
| 7,419,190 B1 | 9/2008 | Atkinson et al. |
| 7,434,846 B2 | 10/2008 | Baumgartner |
| 7,445,249 B2 | 11/2008 | Feger et al. |
| 7,455,330 B2 | 11/2008 | Baumgartner |
| 7,464,970 B2 | 12/2008 | Yamada et al. |
| 7,469,880 B2 | 12/2008 | Green et al. |
| 7,469,936 B2 | 12/2008 | Norman |
| 7,497,480 B2 | 3/2009 | Kerin et al. |
| 7,523,966 B2 | 4/2009 | O'Neill et al. |
| 7,527,303 B2 | 5/2009 | Furuya |
| 7,530,605 B2 | 5/2009 | Rigollet et al. |
| 7,644,958 B2 | 1/2010 | Postler |
| 7,651,138 B2 | 1/2010 | Feger et al. |
| 7,686,349 B2 | 3/2010 | Guest |
| 7,726,700 B2 | 6/2010 | Norman |
| 7,810,850 B2 | 10/2010 | O'Neill et al. |
| 7,823,930 B2 | 11/2010 | Feger et al. |
| 7,841,630 B1 | 11/2010 | Auray et al. |
| 2003/0217571 A1 | 11/2003 | Turnau et al. |
| 2004/0021120 A1 | 2/2004 | Turnau, III et al. |
| 2006/0208213 A1 | 9/2006 | Turnau et al. |
| 2007/0075542 A1 | 4/2007 | Glaze et al. |
| 2007/0241562 A1 | 10/2007 | O'Neill |
| 2008/0061550 A1 | 3/2008 | Brosius et al. |
| 2008/0238088 A1 | 10/2008 | Webb |
| 2008/0238096 A1 | 10/2008 | Kees et al. |
| 2008/0279621 A1 * | 11/2008 | Chaupin ............... F16L 37/088 403/345 |
| 2009/0001712 A1 | 1/2009 | Webb et al. |
| 2009/0194990 A1 | 8/2009 | Williams |
| 2009/0278346 A1 * | 11/2009 | O'Brien ............... F16L 37/091 285/23 |

FOREIGN PATENT DOCUMENTS

| | | |
|---|---|---|
| JP | WO2005/106311 A1 | 11/2005 |
| WO | WO 03/089827 A2 | 10/2003 |

OTHER PUBLICATIONS

Search Report and Written Opinion mailed on Jan. 24, 2011 for PCT/US2010/053004.

Search Report and Written Opinion mailed on Feb. 8, 2011 for PCT/US2010/053029.

Joseph Schutte, et al., U.S. Appl. No. 12/603,161, filed Oct. 21, 2009, entitled "Supply Stop With Connection Verification".

William Franklin Turneau, III, U.S. Appl. No. 12/603,121, filed Oct. 21, 2009, entitled "Bias Release Cartridge".

International Preliminary Report mailed on Dec. 13, 2011 for PCT/US2010/053004.

* cited by examiner

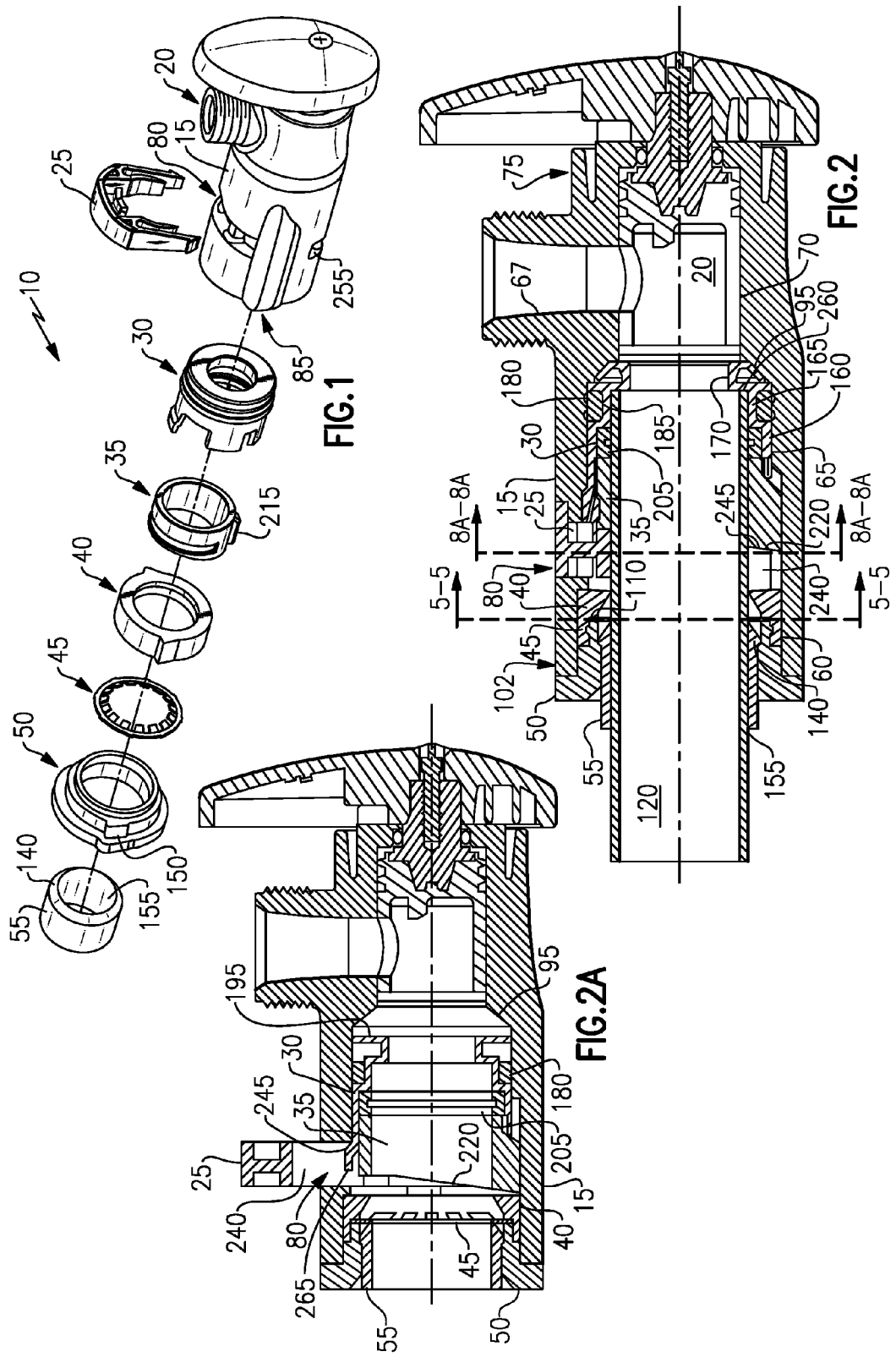

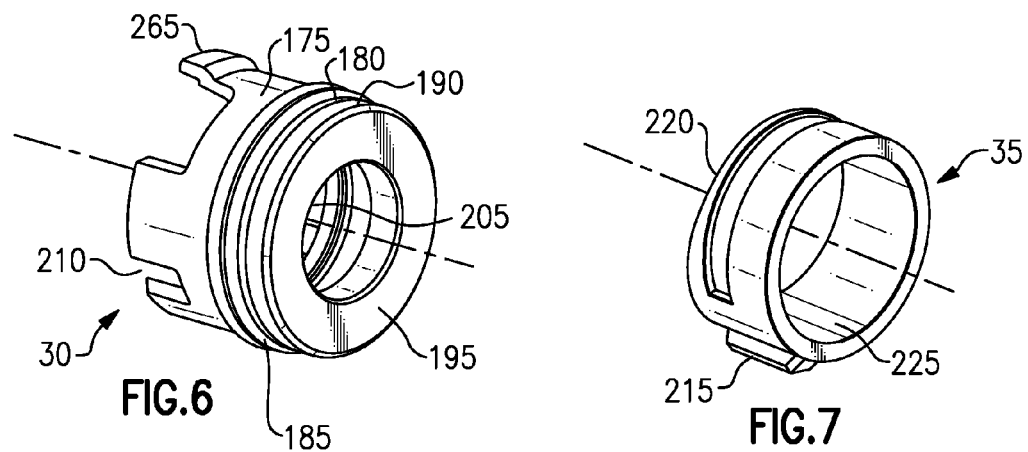
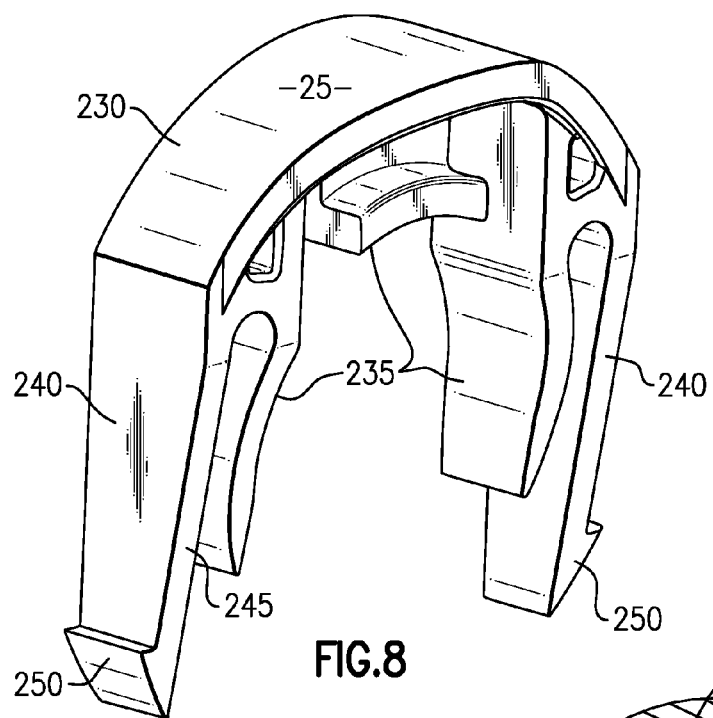
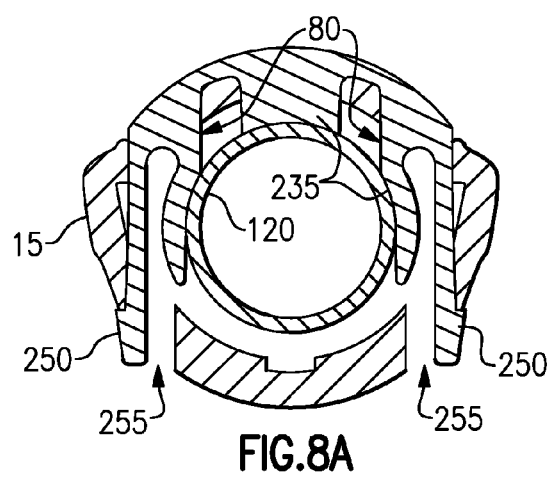

ANTI-ROTATION GRIPPER RING

REFERENCE TO RELATED APPLICATION

Cross reference is made to copending U.S. patent application Ser. No. 12/603,161 entitled "SUPPLY STOP WITH CONNECTION VERIFICATION"; and Ser. No. 12/603,121 entitled "BIAS RELEASE CARTRIDGE".

BACKGROUND

Snap-fit or quick connectors are employed in a wide range of applications including automotive and industrial applications, among others. Such quick connectors utilize retainers or locking elements for securing one connector component, such as a tubular conduit, within a complimentary bore of another connector component or body. These retainers are typically of the axially-displaceable or radially-displaceable type. The terms "axially-displaceable" or "radially-displaceable" are taken relative to the axial bore through a female component.

In a typical quick connector with an axially displaceable retainer, the retainer is mounted within a bore in a body of one connector component. The retainer has a plurality of radially and angularly extending legs that extend inwardly toward the axial center line of the bore in the body. A tube to be sealingly mounted in the bore in one component includes an outwardly extending portion or a flange that abuts an inner peripheral surface of the retainer legs. Seal and spacer members as well as a bearing or top hat are typically mounted in the bore ahead of the retainer to form a seal between the body and the component if the component is lockingly engaged with the retainer legs in the body.

Radially displaceable retainers are also known in which the retainer is radially displaceable through aligned bores or apertures formed transversely to the main through bore in the body. The radially displaceable retainer is typically provided with a pair of depending legs that are sized and positioned to slip behind the outwardly extending portion or flange on the tube only when the tube is fully seated in the bore in the body. This ensures a positive locking engagement of the tube with the body as well as providing an indication that the tube is fully seated since the radially displaceable retainer can be fully inserted into the body only when the tube has been fully inserted into the bore in the body.

Other quick connectors utilize retainers designed to lockingly engage beadless endforms. One type of such retainers forms an annular clip with a plurality of radially inward extending, flexible fingers, that engage the endform at an angle to resist pullout of the endform from the connector body. Another type has a radially inward projection which engages a recess in the endform.

SUMMARY OF THE INVENTION

According to a non-limiting embodiment, an apparatus for minimizing rotation thereabout has a housing that has a keyway and holds the conduit. A gripper holds the conduit and opposes rotation of it. The gripper has a key for cooperating with the keyway such that the housing does not rotate about the gripper.

According to another non-limiting embodiment, an apparatus for minimizing rotation thereabout has a first housing having a first keyway. A second housing disposed in the first housing has a second keyway and a first key cooperating with the first keyway such that the second housing does not rotate in the first housing. A gripper holds the conduit and opposes rotation of the conduit and has a second key for cooperating with the second keyway such that the second housing does not rotate about the gripper.

BRIEF DESCRIPTION OF THE DRAWINGS

FIG. 1 is a perspective, disassembled view of an embodiment of a supply stop.

FIG. 2 is an assembled, cutaway view of the supply stop of FIG. 1 in an installed position.

FIG. 2A is a, cutaway view of the supply stop of FIG. 2 in an uninstalled position.

FIG. 6 is a perspective view of a verification cartridge of FIG. 1.

FIG. 7 is a perspective view of a compression ring of FIG. 1.

FIG. 8 is a perspective view of a verification clip of FIG. 1.

FIG. 8A is a cross sectional schematic view of an assembled verification clip seated in a body of FIG. 1, taken along line 8A-8A of FIG. 2.

DESCRIPTION

Figure 3:
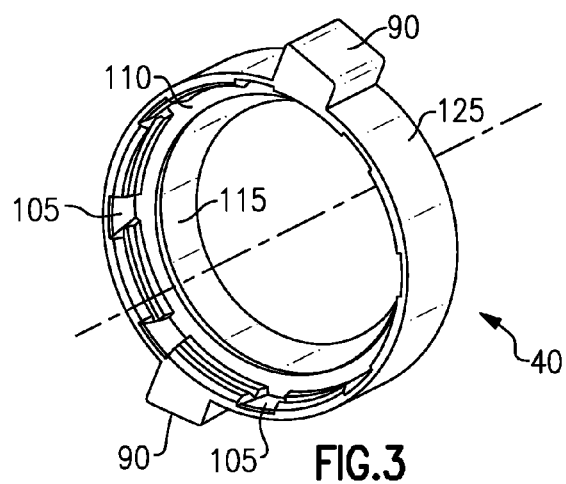
FIG. 3 is a perspective view of a retainer of FIG. 1.

Referring to FIGS. 1 and 2, a non-limiting embodiment of a supply stop 10 is shown. The embodiment has a body 15, a valve portion 20, a verification clip 25, a verification cartridge 30, a compression ring 35, a backer ring 40, a gripper ring 45, a retainer 50 and a collet 55.

A body 15 has a main inlet bore 60, an outlet bore 67, a minor bore 70 in which the valve portion 20 is disposed, and a handle assembly 75. The body further has a semi-circular opening 80 (see also FIG. 8A) in which the verification clip 25 may be inserted as will be discussed herein. The body 15 also has a pair of outboard openings 85 (see also FIG. 5) extending from the main bore 60 into which ears 90 extending from the backer ring 40 are inserted (see also FIG. 5) as will be discussed herein below.

The body 15 has a chamfered surface 95 that extends from the main bore 60 to the minor bore 70 to form an interference fit with the verification cartridge 30 as will also be discussed herein below.

Referring to FIGS. 2-5, the collet 55, the retainer 50 and gripper ring 45, the backer ring 40 form an assembly 100 in the body 15.

In FIG. 3, the backer ring 40 is shown having a plurality of indentations 105 and an inner wall 110, and a flange 115 backing the indentations depending inwardly therefrom. The flange 115 has approximately the same inner diameter as a conduit such as a pipe 120 (see FIGS. 2 and 5) that might be passed therethrough to provide fluid through the inlet bore 60 to the valve portion 20. An outer surface 125 of the backer ring 40 has a pair of ears 90 that fit into a pair of outboard openings 85 (see also FIG. 5) in the body 15.

Figure 4:
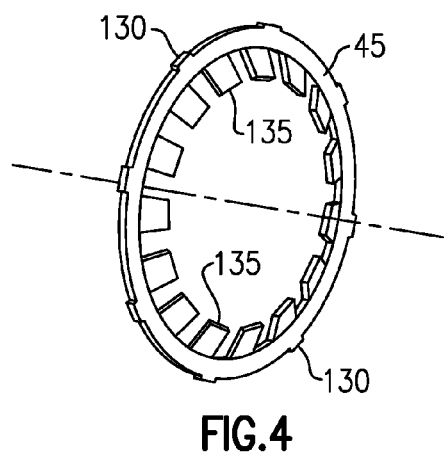
FIG. 4 is a perspective view of a gripper ring of FIG. 1.

As shown in FIG. 4, the gripper ring 45 has a plurality of outwardly depending fingers 130 that mate with the indentations 105 in the backer ring 40. The gripper ring 45 also has a plurality of teeth 135 that extend within the inner bore 60 of the body 15 through which the pipe 120 extends and form an interference fit with the pipe when the pipe is inserted through the gripper ring 45. The teeth 135 extend in the direction the pipe 120 is inserted into the body 15 so that attempts to remove the pipe from within the body are opposed by the teeth 135 that dig into the pipe 120 during such an attempt. The teeth 135 also oppose rotation of the gripper ring 45 about the pipe 120.

Figure 5:
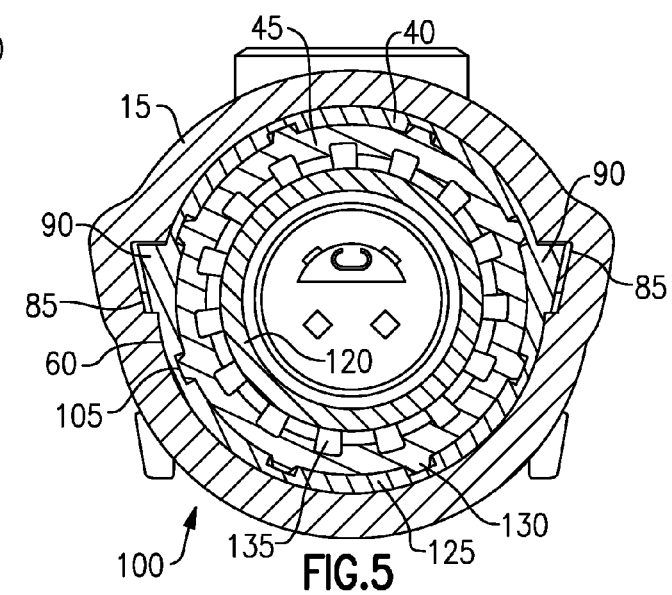
FIG. 5 is a cross sectional view of an assembled retainer, gripper ring and body of FIG. 1, taken along line 5-5 of FIG. 2.

As shown in FIG. 5, the ears 90 of the backer ring 40 are inserted into the outboard openings 85 in the body 15 thereby preventing the backer ring 40 from any rotation therein. Further, the outwardly extending fingers 130 of the gripper ring 45 fit within the indentations 105 in the backer ring 40 thereby preventing the gripper ring 45 from rotating within the backer ring 40.

Referring to FIGS. 2 and 2A, after insertion of the insertion of the backer ring 40, the gripper ring 45, the collet 55 is inserted into the retainer 50. An outward extension 140 of the collet 55 gets hung up on an interior shoulder of the retainer 50. The retainer 50, similar to the backer ring 40, has a pair of ears 150 for insertion into the outboard openings 85 in the body 15 body to seal the body and prevent leakage therefrom. The retainer 50 also serves to hold the gripper ring 45 within the indentations 105 in the backer ring 40. The collet, the retainer 50, and the backer ring 40 in the body 15, may be constructed of a similar material, such as a plastic or polymer, that may be sonically welded together. A sonic weld provides a strong bond and helps minimize leaks through the end of the body 15. The collet 55 has an inner diameter 155 that approximates the diameter of the pipe 120 through the collet and assist in guiding the pipe into the body for positive retainment therein.

Referring now to FIGS. 2 and 6, verification cartridge 30 is shown. The verification cartridge has a first interior diameter 160, a second interior diameter 165 and a third interior diameter 170. The first interior diameter 160 is designed to hold the compression ring 35, the second interior diameter 165, is designed to hold an end of the pipe 120 to be inserted therein, and the third interior diameter 170 forms a passageway through which fluid flows to the valve portion 20. The outer surface 175 includes a first sealing element 180 that may be disposed in a groove 185 disposed outside the second interior diameter 170. A second groove 190 defines an exterior flange 195 that has a chamfered surface 220 that interacts with the chamfered surface 95 of the body 15 body of the valve portion, as will be discussed herein below. The first inner diameter 160 has a second seal 205 disposed thereon a juncture between the second inner diameter 165 and the first inner diameter 160. Interference tab 265 helps prevent insertion of verification clip 25 if the verification cartridge and compression ring are not properly in position as will be discussed herein below.

The first and second seals 180, 205 disposed in the verification cartridge may be co-injection molded with the body of the verification cartridge 30. The verification cartridge is designed to have an interference fit within the body 15 so that seal 180 minimizes leakage from the valve portion 20 back towards the retainer 50. The seal 205 is not designed to have an interference fit initially with the pipe 120 that passes therethrough, as will be discussed herein. The verification cartridge has a groove 210 therein for receiving a position tab within the compression ring, as will be discussed herein.

Referring now to FIGS. 1, 2, 2A and 7, the compression ring 35 has a location tab 215 cooperating with the groove 210 of the verification cartridge. The compression ring has a chamfered surface 220 that cooperates with the verification clip 25, as will be discussed herein. The compression ring also has an interior bore 225 through which a pipe extends therethrough.

Referring now to FIGS. 1, 2, 8 and 8A, the verification clip 25 and its relationship to the body 15 of the supply stop 10 is shown. The verification clip 25 has an upper arcuate portion 230 that conforms to the shape of the exterior of the body 15 if inserted therein, a plurality of arcuate engagement members 235 for engaging the pipe 120, and two legs 240. Each leg is flexible, has an angled side 245 that is designed to engage the chamfered surface 220 of the compression ring 35 to move axially towards the verification cartridge 30 and a pair of snap tabs 250 at the ends of the legs. Each of the snap tabs 250 is designed to fit within openings 255 in the body 15. The flexibility of each of the legs 240 causes the legs to create a signal such as an audible click to be heard when the snap tabs 250 are released to extend beyond the body 15 when encountering opening 255 after being flexed inwardly to be inserted into the body 15.

Referring to FIG. 2A, to assemble the supply stop 10, the verification cartridge 30 is inserted into the body 15 before the compression ring 35. The fingers 130 of the gripper ring 45 are then inserted into the indentations 105 of the backer ring 40 so that the gripper ring does not rotate within the backer ring. The ears 90 of the backer ring 40 are inserted into the outboard openings 85 of the body 15 so that the backer ring and the gripper ring inserted in the backer ring do not rotate within the body. The collet is inserted into the retainer. Then the collet and retainer are inserted into the body 15. The collet 55, the retainer 50, the gripper ring 45, the backer ring 40 are all then sonically welded (or glued or the like) together and to the body 15. The verification cartridge 30 and the compression ring 35 are still free to move axially within the body 15. Note that exterior flange 195 is unbent and does not contact the chamfered surface 95 of the body 15. Note also that verification clip 25 is blocked from insertion into opening 80 by interference tab 265 on the verification cartridge 30 and by compression ring 35. The angled surface 245 of the legs 240 of the verification clip 25 do not reach the chamfered surface 220 of the compression ring 35 to move the compression ring towards the valve portion 20.

Referring now to FIG. 2, a pipe 120 is inserted into the body 15 through the collet 55, the compression ring 35 and the verification cartridge 30. While being inserted, an end 260 of the pipe 120 enters the second portion 165 of a reduced diameter within the verification cartridge and pushes the verification cartridge towards the valve portion 20 such that the exterior flange 195 of the verification cartridge 35 engages the chamfered surface 95 of the body 15 and bends backwardly towards the compression ring 35. The compression ring 35 is disposed at this time within the verification cartridge 30.

Because the interference tab 265 and the compression ring 35 are moved axially by insertion of the pipe 120, a user may then insert the verification clip 25 within the opening 80 within the body 15. The angled surfaces 245 of the legs 240 then have access to and engage the chamfered surface 220 of the compression ring 35, the surfaces cooperating thereby to drive the compression ring axially towards the valve portion 20. As the compression rings moves, the second or inner seal 205 of the verification cartridge is compressed by contact with the compression ring and the inner seal then makes contact with the pipe 120 providing sealing thereby. As the verification clip continues to move, its legs 240 extend beyond the body 15 through opening 255 and an audible click may be heard signaling to a user that installation is complete.

If the verification clip 25 is not fully inserted, the compression ring 35 will not compress the inner seal 205 properly and leakage will be detected if the water is turned on. Furthermore, if the compression ring 35 does not move far enough axially, because the pipe 120 is not inserted far enough, the legs 240 of the verification clip 25 will not move far enough in cooperation with the chamfered surface 220 of the compression ring 35 to provide an audible click.

The exterior flange 195 of the verification cartridge 30 provides two functions. First, if the pipe 120 is not inserted far enough into the body 15 (or not at all), the exterior flange 195 is flexible enough so that it pushes the verification cartridge 30, and the compression ring 35 thereby, back towards the backer ring 40 thereby minimizing a probability that a user can insert the verification clip 25 far enough into the body 25 to believe the pipe 120 is properly installed. Secondly, if the supply stop has to be removed, reused or adjusted, after the verification clip is removed, the flexible exterior flange interacts with the chamfered surface 95 of the body to push the verification cartridge and compression ring back towards the backer ring 40 so they can be accessed, adjusted or reused.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A supply stop comprising:
    a supply stop body defining a bore and an outboard opening on a radially inner surface of said body,
    a backer ring having a backer ear disposed on a radially outward surface thereof, said backer ear configured to be inserted into said outboard opening such that said supply stop body does not rotate about said backer ring, said backer ring defining an indentation on a radially inner surface thereof,
    a gripper ring configured to oppose rotation of said backer ring about a conduit inserted therein, said gripper ring having a finger configured to cooperate with said indentation such that said backer ring does not rotate about said gripper ring, and wherein said finger is disposed on a radially outward portion of said gripper ring.

2. The supply stop of claim 1 further comprising:
    a retainer, said retainer and said backer ring configured to trap said gripper ring therebetween.

3. The supply stop of claim 2 wherein said backer ring and said retainer are in contact with each other.

4. The supply stop of claim 3 wherein said backer ring and said retainer are sonically welded together.

5. The supply stop of claim 2 wherein said retainer and said backer rings have a cylindrical shape.

6. The supply stop of claim 2 wherein said retainer includes a retaining ear disposed on a radially outward surface thereof, said retaining ear configured to be inserted into said outboard opening to limit relative rotation between said supply stop body and said retainer.

7. The supply stop of claim 1 wherein said outboard opening extends from an end of said bore.

8. The supply stop of claim 1 wherein said gripper ring has a tooth extending radially inward from a gripper body.

9. The supply stop of claim 1 wherein said backer ring is configured to be releasably secured from within said supply stop body.

10. The supply stop of claim 1 wherein said finger is dimensioned to be inserted into said indentation such that said gripper ring does not contact said supply stop body when said gripper ring and said backer ring are located in an assembled position within said bore.

11. The supply stop of claim 1 wherein said finger is a plurality of fingers positioned at spaced intervals about a radially outer surface of said gripper ring, said indentation is a plurality of indentations positioned at spaced intervals within said radially inner surface of said backer ring, and said plurality of fingers are configured to be inserted into said plurality of indentations.

12. A supply stop comprising:
    a supply stop body defining a bore and an outboard opening, said outboard opening extending radially outside said bore; and
    a locking portion including a backer ring and a gripper ring,
    said backer ring including a backer ear disposed on a radially outward surface thereof, said backer ear configured to be inserted into said outboard opening to limit relative rotation between said supply stop body and said backer ring,
    said gripper ring including a finger configured to cooperate with an indentation on a radially inner surface of said backer ring to limit relative rotation between said backer ring and said gripper ring, wherein said finger is disposed on a radially outward portion of said gripper ring.

13. The supply stop of claim 12 further comprising:
    a sealing portion configured to be inserted into said bore for minimizing leakage from said supply stop body when a conduit is inserted into said bore, and
    a verification clip configured to be selectively inserted into an arcuate opening defined by said supply stop body for compressing said sealing portion.

14. The supply stop of claim 13, wherein said verification clip is axially spaced from said gripper ring when said verification clip is inserted into said arcuate opening.

15. The supply stop of claim 13, wherein said arcuate opening includes a plurality of arcuate openings spaced apart in a circumferential direction about said supply stop body and each extending through a thickness of said supply stop body, said verification clip includes an upper arcuate portion and a plurality of legs extending from said upper arcuate portion, said plurality of legs are configured to be inserted in said plurality of arcuate openings.

16. The supply stop of claim 12 wherein said locking portion further comprises a retainer, said retainer and said backer ring configured to trap said gripper ring therebetween.

17. The supply stop of claim 16 wherein said retainer includes a retaining ear disposed on a radially outward surface thereof, said retaining ear configured to be inserted into said outboard opening to limit relative rotation between said supply stop body and said retainer.

18. The supply stop of claim 12 wherein said outboard opening extends from an end of said bore.

19. The supply stop of claim 12 wherein said gripper ring has a tooth configured to oppose extraction of a conduit inserted into said bore of said supply stop body.

20. The supply stop of claim 12, wherein said outboard opening is a plurality of outboard openings formed at spaced intervals about said bore, said backer ear is a plurality of backer ears positioned at spaced intervals about said radially outward surface of said backer ring, and said plurality of backer ears are configured to be inserted into said plurality of outboard openings.

21. A supply stop comprising:
a supply stop body defining a bore and an outboard opening, said outboard opening extending radially outward from said bore,
a locking portion including a backer ring, a gripper ring and a retainer,
said backer ring including a backer ear disposed on a radially outward surface thereof, said backer ear configured to be inserted into said outboard opening to limit relative rotation between said supply stop body and said backer ring,
said backer ring configured to be releasably secured from within said supply stop body,
said gripper ring including a finger configured to cooperate with an indentation on a radially inner surface of said backer ring to limit relative rotation between said backer ring and said gripper ring, wherein said finger is disposed on a radially outward portion of said gripper ring,
said gripper ring including a tooth extending radially inward from a gripper body,
said retainer and said backer ring configured to trap said gripper ring therebetween,
a sealing portion configured to be inserted into said bore configured to minimize leakage from said supply stop body when a conduit is inserted into said bore to engage said tooth, and
a verification clip configured to be selectively inserted into an arcuate opening defined by said supply stop body for compressing said sealing portion.

22. The supply stop of claim 21 wherein said retainer includes a retaining ear disposed on a radially outward surface thereof, said retaining ear configured to be inserted into said outboard opening to limit relative rotation between said supply stop body and said retainer.

23. The supply stop of claim 21, wherein:
said sealing portion includes a verification cartridge defining an outer periphery and an inner periphery, a first sealing element disposed about the outer periphery, and a second sealing element disposed about the inner periphery; and
wherein said verification clip is configured such that insertion of said verification clip into said arcuate opening causes the verification cartridge to move along a longitudinal axis of said bore, thereby causing said exterior flange to compress against a chamfered surface of the supply stop body located at an end of said bore.

* * * * *

UNITED STATES PATENT AND TRADEMARK OFFICE
CERTIFICATE OF CORRECTION

PATENT NO.         : 9,523,454 B2
APPLICATION NO.    : 12/603142
DATED              : December 20, 2016
INVENTOR(S)        : Joseph P. Schutte et al.

Page 1 of 1

It is certified that error appears in the above-identified patent and that said Letters Patent is hereby corrected as shown below:

In the Claims

In Claim 23, Column 8, Line 23; after "causing" replace "said" with --an--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*